United States Patent
Wirth et al.

(10) Patent No.: US 6,615,954 B2
(45) Date of Patent: Sep. 9, 2003

(54) MONITORING SYSTEM AND METHOD FOR BRAKE DISKS

(75) Inventors: Xaver Wirth, Ismaning (DE); Ludwig Schlenk, Schwabhausen (DE); Ralf Schmid, Vaterstetten (DE)

(73) Assignee: Knorr-Bremse Systeme fur Schienenfahrzeuge GmbH, Munich (DE)

(*) Notice: Subject to any disclaimer, the term of this patent is extended or adjusted under 35 U.S.C. 154(b) by 0 days.

(21) Appl. No.: 09/834,959

(22) Filed: Apr. 16, 2001

(65) Prior Publication Data

US 2002/0148690 A1 Oct. 17, 2002

(30) Foreign Application Priority Data

Apr. 14, 2000 (DE) .......................................... 100 18 513

(51) Int. Cl.[7] .............................. F16D 66/00; B60T 7/18
(52) U.S. Cl. ................................. 188/1.11; 188/1.11 R; 188/264 AA; 303/20; 303/191
(58) Field of Search ..................... 188/1.11 E, 1.11 R; 303/20, 191; 701/70; 340/453, 463; 374/141, 152, 121; 246/169 A, 246; 250/252.1, 342; 116/216; 73/121

(56) References Cited

U.S. PATENT DOCUMENTS

| | | | | |
|---|---|---|---|---|
| 4,340,890 A | * | 7/1982 | Fritze | |
| 4,550,589 A | * | 11/1985 | Wright, Jr. | |
| 4,674,326 A | | 6/1987 | Reinecke | |
| 4,695,823 A | * | 9/1987 | Vernon | |
| 4,790,606 A | * | 12/1988 | Reinecke | 188/1.11 R |
| 4,820,057 A | * | 4/1989 | Berndt | 374/141 |
| 4,964,679 A | * | 10/1990 | Rath | 188/1.11 R |
| 5,149,025 A | * | 9/1992 | Utterback et al. | 246/169 A |
| 5,189,391 A | * | 2/1993 | Feldmann et al. | |
| 5,331,311 A | * | 7/1994 | Doctor | 340/463 |
| 5,372,221 A | * | 12/1994 | Jalbert | |
| 5,446,451 A | * | 8/1995 | Grosskopf, Jr. | 246/169 A |
| 5,483,827 A | | 1/1996 | Kulka et al. | |
| 5,524,974 A | * | 6/1996 | Fischle et al. | 188/1.11 R |
| 5,812,053 A | * | 9/1998 | Kovack | 188/1.11 R |

(List continued on next page.)

FOREIGN PATENT DOCUMENTS

| | | | |
|---|---|---|---|
| DE | 3015559 | * | 10/1981 |
| DE | 31 48 552 A1 | | 5/1983 |
| DE | 35 02 052 A1 | | 7/1986 |
| DE | 40 06 885 | | 10/1990 |
| DE | 41 03 917 | | 8/1992 |
| DE | 196 16 258 | | 4/1996 |
| EP | 0 570 438 | | 11/1993 |
| EP | 1 081 845 A2 | | 3/2001 |
| JP | 5896141 | * | 6/1983 |

OTHER PUBLICATIONS

Translation of DE 4006885, Mar. 2003.*
Translation of DE 19616258, Mar. 2003.*

Primary Examiner—Douglas C. Butler
(74) Attorney, Agent, or Firm—Barnes & Thornburg

(57) ABSTRACT

A monitoring system for brake disks, particularly of rail vehicles, having at least two sensors which are arranged in the brake disk or in the proximity of the brake disk and whose sensor signals relate to the temperature of the brake disk. The monitoring system includes at least one transmitter which transmits the sensor signals, and at least one receiver which receives the transmitted sensor signals in a wireless manner. Furthermore, the invention relates to a method of monitoring the temperature of brake disks. The method includes measuring the temperature of at least one brake disk, converting sensor signals to processible values; transmitting the values or the sensor signals to a receiver in one or more of an encoded manner and successively in a timed manner; and processing the received values or sensor signals in one or more of the control unit and the regulating unit.

25 Claims, 4 Drawing Sheets

U.S. PATENT DOCUMENTS

| | | | | |
|---|---|---|---|---|
| 5,909,171 A | * | 6/1999 | Kyrtsos | 188/1.11 R |
| 5,936,155 A | | 8/1999 | Francois et al. | |
| 6,006,868 A | * | 12/1999 | Klink | |
| 6,011,827 A | * | 1/2000 | Kyrtsos | |
| 6,095,289 A | * | 8/2000 | Ray et al. | 188/1.11 R |
| 6,203,115 B1 | * | 3/2001 | Rosendahl et al. | |
| 6,250,430 B1 | * | 6/2001 | Kyrtsos | |
| 6,260,665 B1 | * | 7/2001 | Kramer et al. | 188/1.11 R |
| 6,310,545 B1 | * | 10/2001 | Sapir | 340/453 |

\* cited by examiner

MONITORING SYSTEM AND METHOD FOR BRAKE DISKS

The invention relates to a monitoring system for brake disks, particularly of rail vehicles, having at least one sensor which is used for monitoring the temperature and which is arranged in the brake disk or in the proximity of the brake disk and whose sensor signals relate to the temperature of the brake disk. Furthermore, the invention relates to a method of monitoring the temperature of brake disks, particularly of rail vehicles.

In the case of rail vehicles and particularly in the case of local trains, the temperature of the brake disks will rise continuously when, during the station stop operation, brake applications are carried out frequently in a successive manner. In the case of a partial failure of generating the brake, a reduction of the travelling speed is therefore very frequently specified. The temperature stress to the disks and the braking action depend considerably on the loading condition of the vehicle and the individual driving style of the respective driver. In the case of a general provision for limiting the speed, such influencing parameters cannot sufficiently be taken into account in the event of a partial failure of brakes or a reduced braking power. When such monitoring systems are used in rail vehicles, another problem is the impact loads (to approximately 100 g) to which the devices are exposed. In comparison to road vehicles, the load to which the devices are exposed is substantially higher. It is therefore necessary to provide reliable data which supply information concerning the braking capacity of the disk brakes and of the entire rail vehicle.

It is therefore an object of the invention to further develop a monitoring system of the above-mentioned type and a monitoring method of the above-mentioned type such that an effective and reliable temperature monitoring of the brake disks of disk brakes, particularly of rail vehicles, is achieved at reasonable cost. It is also an object of the present invention to provide a monitoring system and a monitoring method by means of which a safe operation of rail vehicles is permitted.

These objects are achieved by a monitoring system for brake disks, particularly of rail vehicles, having at least one sensor used for monitoring the temperature, which is arranged in the brake disk or in the proximity of the brake disk and whose sensor signals relate to the temperature of the brake disk. At least one transmitter transmitting the sensor signals and at least one receiver receiving the transmitted sensor signals is provided. The transmitting of the sensor signal from the transmitter to the receiver takes place in a wireless manner.

As a result of this solution according to the invention, the temperatures of brake disks can be measured and transmitted very reliably. Preferably, data or signals can also be transmitted in a wireless manner from the receiver to the transmitter. The transmitter is preferably arranged on an axle, in the disk brake and/or in or on the brake disk. As a result, it is not necessary to forward the electric signals containing the temperature values by a device sliding on an electric contact to a further-processing system, for example, a control and/or regulating unit. Thus, the use of parts which easily wear out is avoided. Within the scope of this invention, the term brake disk comprises also a friction disk, which, may be constructed as part of a wheel, or a disk brake.

Also preferably, the sensors are thermoelements or infrared measuring sensors.

Also preferably, at least two sensors are provided for each brake disk, which permits a more reliable measuring of the temperature of the brake disk. The reason is that, when at least two sensors are used, the probability will be reduced that both sensors are arranged in a hot spot or in a cold spot of the brake disk. When one transmitter is provided for several sensors, which are assigned to one brake disk or several brake disks, additional costs can be avoided because less material and fewer transmitters are used.

When a single receiver is provided for an axle or an entire car of the rail vehicle, the costs for such devices can be reduced further.

At least one signal converter, which converts the sensor signals, is arranged in the proximity of a transmitter or is integrated with the transmitter. On the basis of this preferable embodiment of the invention, it is possible, for example, when using thermoelements as sensors, to increase the low voltage in order to permit a more reliable wireless transmission to the receiver. The sensor signals, or the sensor signals converted by the at least one signal converter can be processed by a control and/or regulating unit which is coupled with the at least one receiver. The processible signals can be used for fully utilizing the maximally possible travelling speed of the trains, which depends on the braking capacity of the disk brakes. In addition, compulsory stopping times can be provided which can be optimally controlled and individually adapted by the control and/or regulating unit or the control and/or regulating system.

If, the control and/or regulating unit forms a unit with the at least one receiver, labor-related time is saved particularly during the assembly.

The at least one sensor may have an active power supply. An active power supply is the supply by a power source which is a primary cell normally a battery, or, for example, a secondary cell normally an accumulator. When, preferably, at least one sensor has a passive power supply, the servicing expenditures of the monitoring system will be lower. A passive power supply exists when the sensor is used as the power source, for example, by utilizing the voltage coming from a thermoelement. An example is the voltage which is released over the thermoelement at room temperature. In which case, the residual voltage, because of the raised temperature by implemented brake applications, can then be used as a measuring value. In addition, a passive power supply can also be implemented in a wireless manner by a base set or the receiver which supplies the transmitter with power in a wireless manner.

When at least one sensor is arranged in the proximity of the brake disk in a wind-deflecting device, more reliable temperature measurements can also be carried out in wind, particularly during a stop of the rail vehicle. During a stop of the rail vehicle, the convection of the heat in the upward direction is utilized. In windy weather, the measured temperature cannot correspond to the average temperature of the brake disks. As a result of the preferred embodiment of the present invention in which a wind deflecting device, particularly a cylinder, is provided, a more reliable temperature measurement can be carried out.

Preferably at least one sensor is arranged in the brake disk and at least one sensor is arranged in the proximity of the brake disk. As a result of this preferred embodiment, a still more exact determination of the average temperature of the brake disk can be obtained.

The transmitter is preferably arranged in the brake disk, particularly in a cooling duct. Because of this preferred embodiment, short cable runs can be achieved from the sensors to the transmitter. The sensor is preferably integrated in the transmitter or the housing of the transmitter.

The transmitter is preferably arranged in the proximity of the brake disk, particularly on the axle assigned to the brake disk. Furthermore, the transmitter and/or the receiver is preferably a transponder. Within the scope of this invention, a transponder is a receiving/transmitting apparatus which operates according to the query-response system. A signal received from the transponder is appropriately encoded and is then sent in an encoded condition and selectively with possibly desired additional information. The signal is automatically decoded and analyzed by another transponder or a device connected behind the transponder or a receiver.

According to the invention, a method for monitoring the temperature of brake disks, particularly of rail vehicles, has the following process steps:

Measuring the temperature of at least one brake disk by means of a sensor at at least one location of the at least one brake disk or in the proximity of the at least one brake disk;

converting sensor signals, which are measured by the at least one sensor, to processible values;

transmitting the values or the sensor signals to a receiver; and processing the received values or the received sensor signals in a control and/or regulating unit.

In this case, the process steps of converting sensor signals and transmitting the values or the sensor signals to a receiver can be exchanged with respect to the time sequence and/or the conversion can take place by the multiplication with a factor. The monitoring method according to the invention represents a simple, effective and reliable monitoring method by means of which the temperatures of brake disks and thus the braking capacity of the disk brakes can be determined.

The transmission and/or the conversion preferably takes place by means of at least one transponder.

Furthermore, the transmission preferably takes place in an encoded or successive manner so that the respective sensor signals or processed values assigned to the respective sensors are assigned by the receiver and/or the control and/or regulating unit. As a result of this preferred process step, it is possible to design the respective sensor signals such that they can be differentiated from other sensor signals, so that the processing becomes unambiguous. Preferably, when several transmitters or transponders are used, and the transmitters or transponders are queried by the receiver successively in a timed manner.

A method of determining the braking capacity of a rail vehicle, in which one or several of the above-mentioned process or processes is/are used, is further developed in that an average value of the sensor signals of each brake disk is determined. By means of the determined average values of all brake disks of the rail vehicle, the braking capacity of each disk is determined. The braking capacity of the rail vehicle is determined by the addition of the braking capacities of the respective disk brakes.

The braking capacity of the respective disk brakes is determined by a definable data set and optionally an interpretation of the data of the data set and the respective measured temperature of the disk brake. The definable data set is preferably experimentally determined by the respective brake disk type with the respective brake blocks. This results in a function of the braking capacity which depends on the temperature. This function, which can be obtained by the interpolation of measured values, is preferably used for the determination of the braking capacity of the disk brakes and thus of the rail vehicle.

Preferably, the maximum speed of the rail vehicle assigned to the determined braking capacity is adjusted and/or stopping times of the rail vehicle are defined.

Other objects, advantages and novel features of the present invention will become apparent from the following detailed description of the invention when considered in conjunction with the accompanying drawings.

DETAILED DESCRIPTION OF THE PREFERRED EMBODIMENTS

In the following figures, identical or corresponding parts are each marked by the same reference numbers, so that they do not have to be introduced again and only the deviations of the embodiments illustrated in these figures from the first embodiment will be explained.

Figure 1:
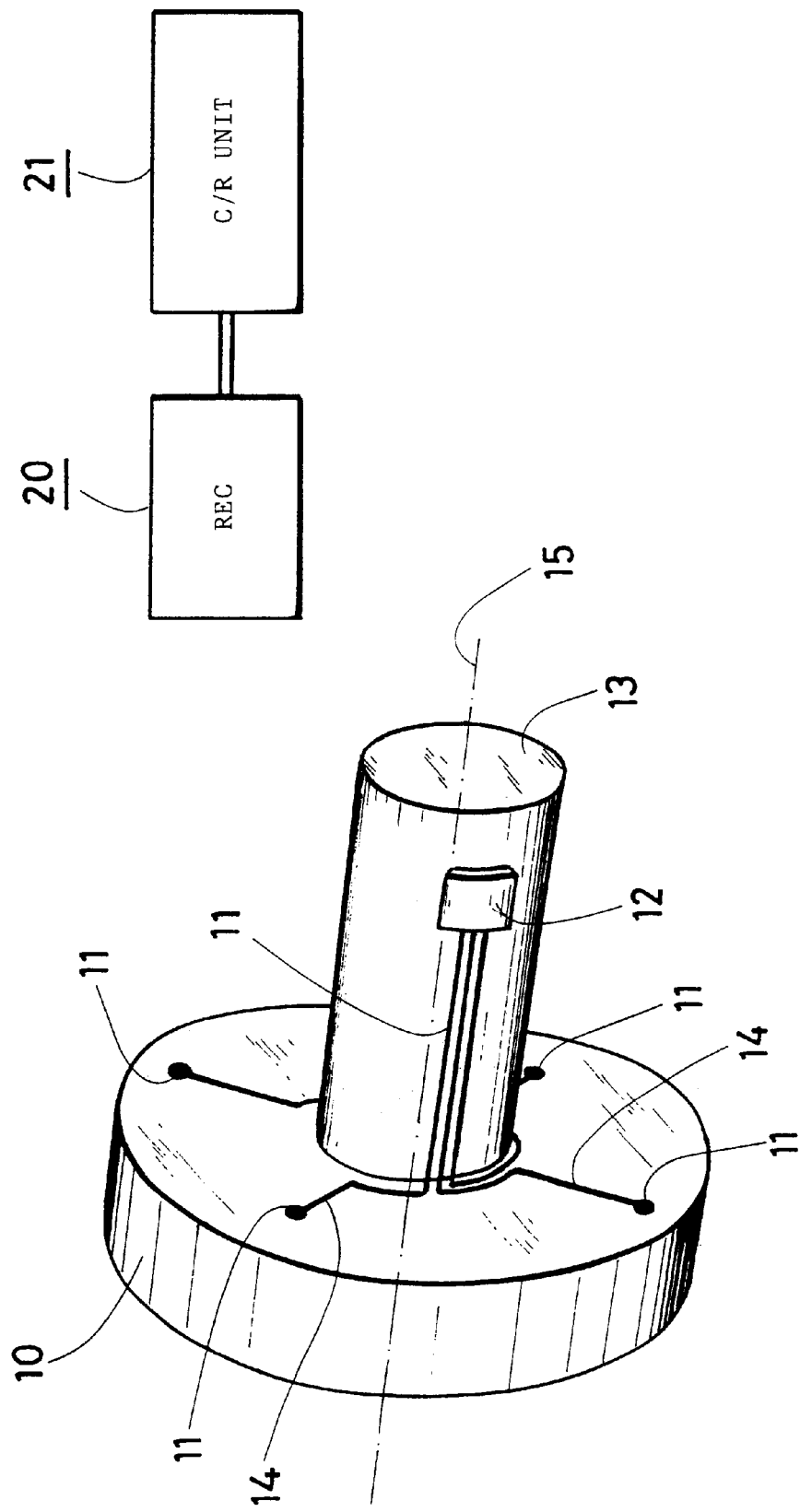
FIG. 1 is a schematic and partially three-dimensional representation of a monitoring system for brake disks according to the invention.

FIG. 1 is a schematic partial view of a three-dimensional representation of a preferred embodiment according to the invention. A brake disk 10 is arranged on an axle 13. The axle 13 has an axis of rotation 15. Four thermoelements 11 are arranged on the brake disk in a radially distributed manner. By way of a cable 14, the thermoelectric voltage is conducted to a transponder 12. In FIG. 1, the cables 14 are shown to be unipolar. However, when thermoelements are used as sensors, these cables have in fact two conductors. For a better illustration, only one conductor was included in FIG. 1. The cable 14 of one of the illustrated thermoelements 11 is not shown to reach the transponder 12, so that only three cables of the four two-conductor cables are shown.

The thermoelectric voltages processed in the transponder 12, as, for example, voltages converted to a higher voltage, are transmitted from the transponder 12 to a receiver 20. The receiver 20 is connected by way of cables with the control and/or regulating unit 21. In this embodiment, the temperature sensors 11 are disposed directly in the brake disk 10 or on the brake disk 10 and are connected with the transponder 12 which is arranged on the axle 13. In this embodiment, the temperature monitoring system therefore consists of a transponder 12 which can be actively or passively driven; of four temperature sensors 11, a receiver station or base set 20 and a control and/or regulating unit 21. The transponder 12 and the temperature sensor 11 may form a unit, particularly in the manner of an integrated construction, or, as illustrated in FIG. 1, may have a separate construction. The transponders 12 may be active transponders; that is, may be supplied by their own power source, such as an accumulator or a battery, or may be passive transponders which are supplied with power in a wireless manner by the base set or the receiver 20. The transponder or transponders 12 transmits/transmit the temperature signal by telemetry to the receiving station 20. In this case, several transponders 12 are successively queried by a receiving station 20 in a timed manner. By means of the wire, the received data are transmitted to the control unit 21 and are processed there for controlling the rail vehicle.

In a preferred embodiment not illustrated in a figure, one or several integrated transponders 12, in which a temperature sensor 11 is integrated, are arranged in the brake disk, for example, in the cooling duct. These send signals, for example, in an encoded manner, to the receiver or successively in a timed manner.

Figure 2:
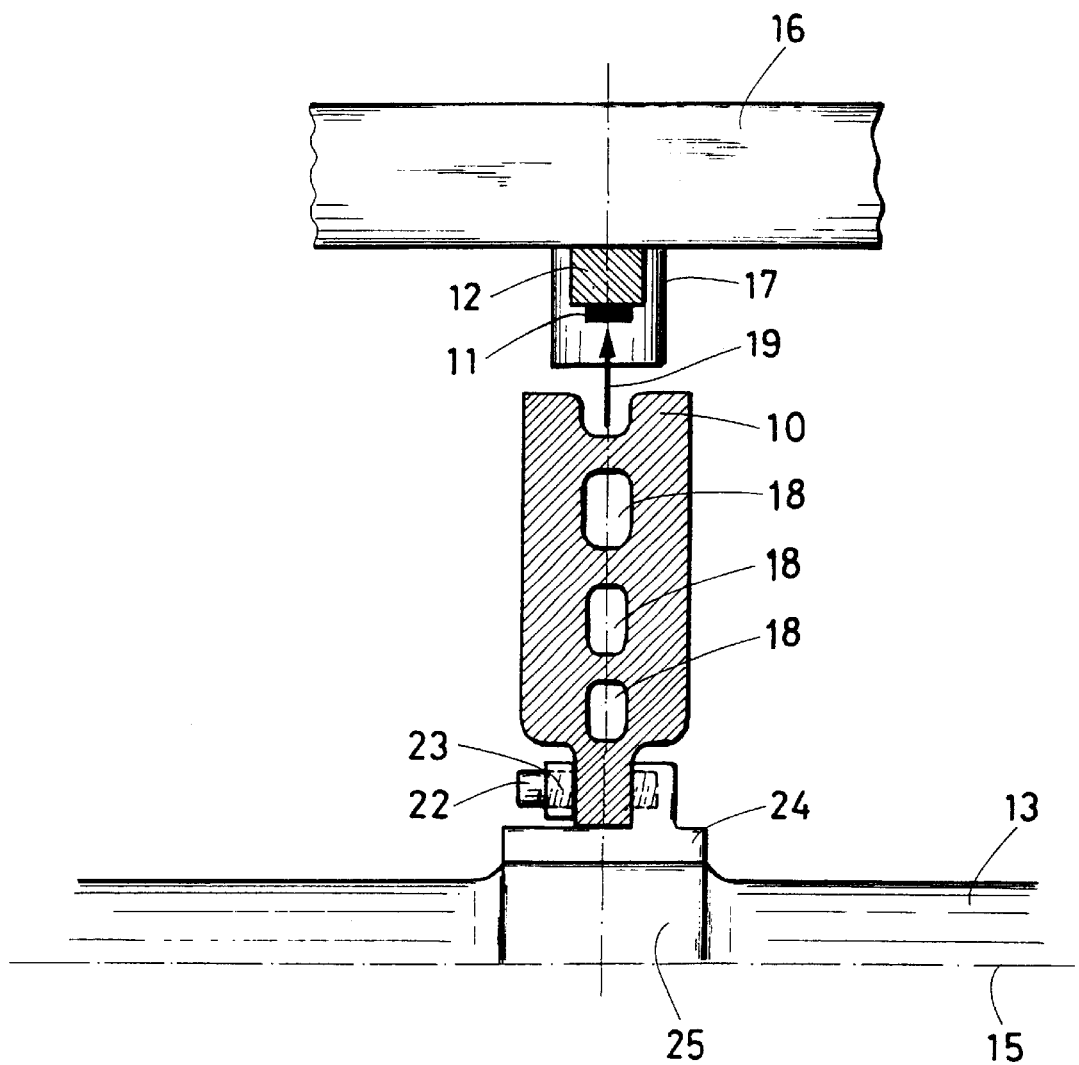
FIG. 2 is a sectional view of a part of a disk brake.

FIG. 2 is a sectional view of a part of a disk brake. The brake disk 10 has cavities 18 which are used for cooling the brake disk 10. Waste heat 19, which is illustrated by an arrow, because of the convection, particularly when the rail vehicle is stopped, will flow in the upward direction and meet a thermoelement 11 which is mounted directly on a transponder 12. The unit consisting of the transponder 12 and the thermoelement 11 is arranged on a tube 17 in order to prevent wind from influencing the measured temperature. The transponder 12 itself is fastened on a support 16.

A screw 22 mounts the brake disk 10 by a clamping ring 23 to the hub 24 on the axle seat 25. Several thermoelements 11 and/or transponders 12 may also be arranged in the proximity of the brake disk 10, specifically at a certain angle which differs from the angle of FIG. 2, in order to obtain a more precise average value of the temperature of the brake disk. Furthermore, an infrared sensor or similar known temperature sensors can also be used as the temperature sensor 11. The braking performance of a disk brake depends to a large extent on the temperature of the brake disk. As a result of the invention, it is possible to measure reliable temperatures on a rotating brake disk. The average brake disk temperature is important for determining the braking performance. For this purpose, an average value is determined by one or several measuring points. The invention is particularly suitable for rail vehicles which have, for example, twenty or more brake disks. In this case, for example, twenty or more transmitters 12 are used and a single receiver 20. In this case, many yards of cable can be saved, and the assembly itself clearly requires lower expenditures.

If the braking performance of all disk brakes and therefore an appropriate maximum speed is determined and correspondingly limited, a specified braking distance can still be maintained and stopping times which are to be provided optionally, are permitted by the determination of the braking capacity of the rail vehicle from the temperatures of the brake disks. In particular, an average value of the temperatures of the respective individual brake disks is determined and, by means of the determined average values of all brake disks of the rail vehicle, the braking capacity is determined by the addition of the braking capacity of the respective disk brakes.

Figure 3:
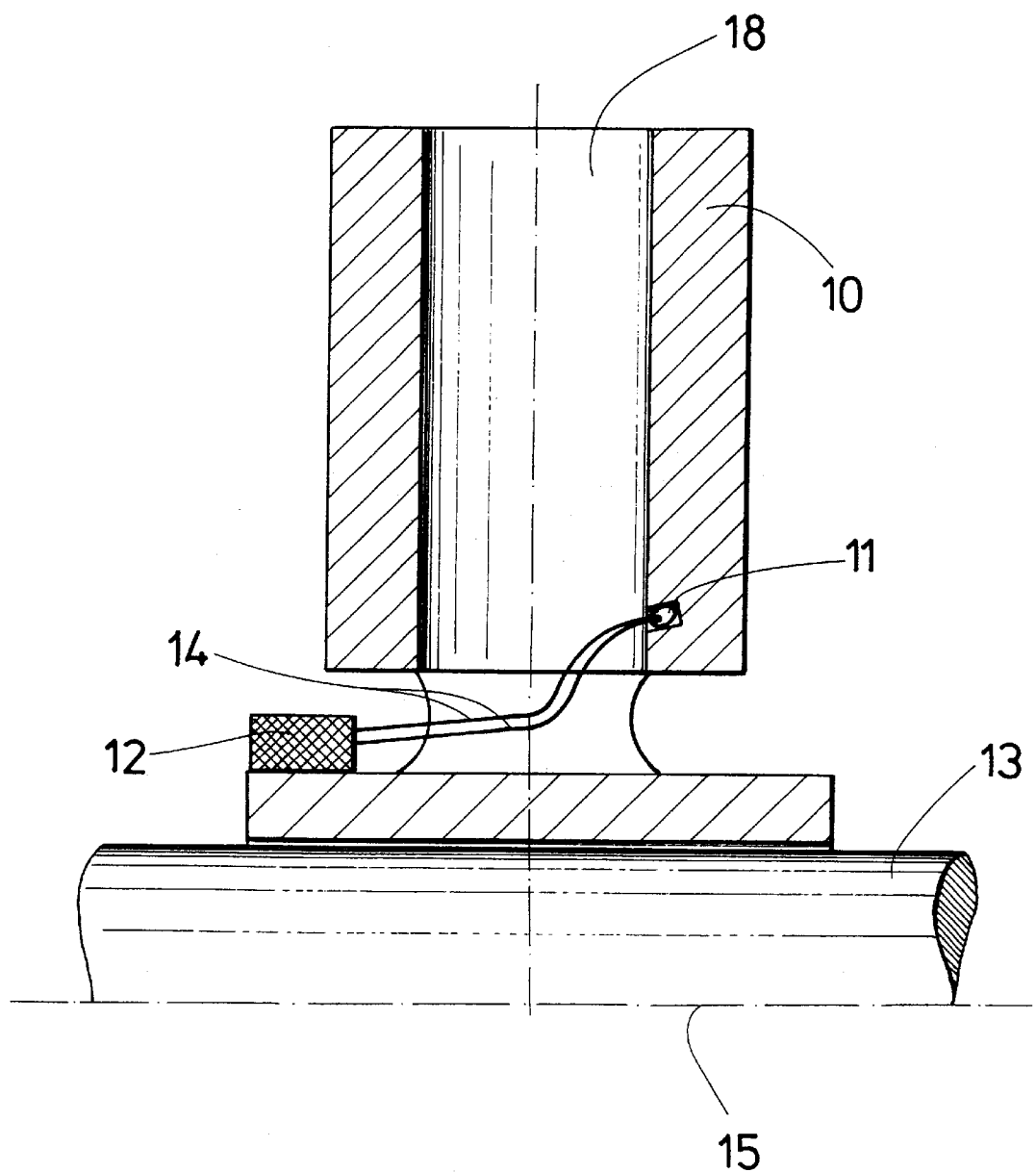
FIG. 3 is a sectional view of a part of a disk brake.

FIG. 3 is a sectional view of a part of a disk brake. A thermoelement 11 is mounted on the brake disk 10 from the inside. Cables 14 lead from the thermoelement 11 to a transponder 12. The transponder is disposed on the disk hub and rotates along with the rotation of the brake disk or the disk hub. As an alternative to the brake disk, a friction disk 30 (FIG. 4) may be provided here which may be a part of a wheel of a rail vehicle.

In this embodiment, the temperature is measured as the mass temperature of the brake disk 10 or of the friction disk 30. The reason is that the temperature at the friction surface 35 or the brake disk surface temperature, thus the temperature which exists at the contact surface of the brake disk or the friction disk to a brake block or the like, can be scattered by the formation of hot spots. The mass temperature provides the average of the temperatures differing in zones.

Figure 4:
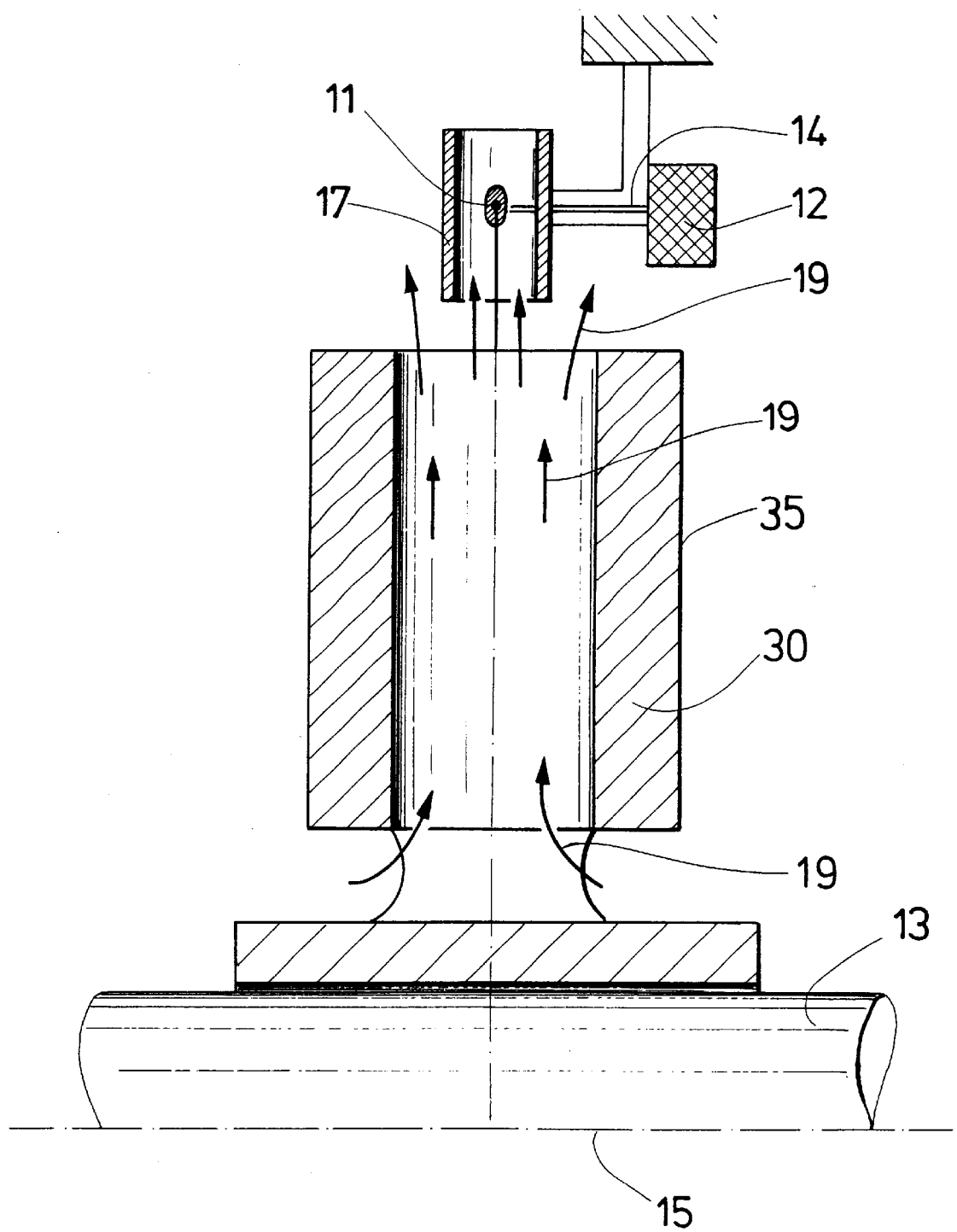
FIG. 4 is another sectional view of a part of a disk brake.

FIG. 4 is a sectional view of another embodiment of the invention. FIG. 4 shows a friction disk 30. The friction surface 35 of the friction disk or brake disk 30 is heated by the braking effect. In FIG. 4, the temperature of the cooling air is measured which is indicated by arrows 19 which show the waste heat. The thermoelement 11 is disposed in a protecting tube 17 which protects against cross wind, and detects the air temperature which, as a result of free convection during a stop in a station, has a defined relationship to the disk temperature.

It is also possible to measure the cooling air temperature during the travel. This cooling air temperature has a certain relationship to the friction ring mass temperature in the case of corresponding brake disk constructions and is then essentially independent of the rotational speed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A monitoring system for brake disks of a rail vehicle comprising:

at least two sensors per brake disk whose sensor signals relate to the temperature of the brake disk;

the sensors being located at one of in the brake disk and in the proximity of the brake disk;

a single transmitter connected to the sensors for receiving and transmitting the individual sensor signals from the at least two sensors to at least one receiver in such manner that the at least one receiver recognizes signals coming from each respective sensor;

at least one receiver which receives the transmitted sensor signals; and the transmitting of the sensor signals from the transmitter to the receiver taking place in a wireless manner.

2. The monitoring system according to claim 1, wherein a single receiver is provided for one axle or an entire car of the rail vehicle.

3. The monitoring system according to claim 1, including at least one signal converter which converts the sensor signals and is in the proximity of a transmitter or is integrated with the transmitter.

4. The monitoring system according to claim 3, wherein the sensor signals, or the sensor signals converted by the at least one signal converter can be processed by a control and/or regulating unit which is coupled with the at least one receiver.

5. The monitoring system according to claim 4, wherein the control and/or regulating unit forms a unit with the at least one receiver.

6. The monitoring system according to claim 1, wherein the single transmitter has an active power supply.

7. The monitoring system according to claim 1, wherein the single transmitter has a passive energy supply.

8. The monitoring system according to claim 1, wherein the sensors are in the proximity of the brake disk in a wind-deflecting device.

9. The monitoring system according to claim 1, wherein the sensors are located in the brake disk.

10. The monitoring system according to claim 1, wherein the single transmitter is in a cooling duct of the brake disk.

11. The monitoring system according to claim 1, wherein the single transmitter is on an axle of the brake disk.

12. The monitoring system according to claim 1, wherein one or both of the single transmitter and the receiver is a transponder.

13. The monitoring system according to claim 1, wherein the at least two sensors and the at least one transmitter are adjacent to each other.

14. The monitoring system according to claim 1, wherein the transmitting takes place in one or more of an encoded manner and successively in a timed manner.

15. The monitoring system according to claim 1, wherein the sensors are located in the proximity of the brake disk.

16. The monitoring system according to claim 1, wherein the sensor signals are individually identifiable.

17. The monitoring system according to claim 1, wherein the sensors and the single transmitter are co-located at one of the brake disk and in the proximity of the brake disk.

18. The monitoring system according to claim 17, wherein the brake disk includes an axle and the sensors and the single transmitter are co-located on a disk/axle combination.

19. The monitoring system according to claim 17, wherein the sensors and the single transmitter are co-located in the proximity of the brake disk.

20. The monitoring system according to claim 17, wherein the sensors and the single transmitter are co-located on the brake disk.

21. A method of monitoring the temperature of brake disks of rail vehicles, the method comprising:

measuring the temperature of at least one brake disk by sensors at at least two locations, those locations being one or more of the at least one brake disk and in the proximity of the at least one brake disk;

converting sensor signals, which are measured by the sensors, to processible values;

transmitting the values or the sensor signals to a receiver in one or more of an encoded manner and successively in a timed manner such that the respective sensor signals or processible values identifiable with their respective sensors are recognizable by one or more of the receiver, a control unit and a regulating unit; and processing the received values or the received sensor signals in one or more of the control unit and regulating unit.

22. The monitoring method according to claim 21, wherein one or both of the transmitting and the converting takes place by at least one transponder.

23. The monitoring method of claim 21 including:

determining an average value of the sensor signals of the respective individual brake disk;

determining, using the determined average value of each brake disk of the rail vehicle, a braking capacity of each disk; and determining the braking capacity of the rail vehicle by the addition of the braking capacities of the respective disk brakes.

24. The method according to claim 23, wherein the braking capacity of the respective disk brakes is determined by one of a definable data set and an interpolation of the data of the data set and of the respectively measure temperature of the disk brake.

25. The method according to claim 23, including adjusting the maximum speed of the rail vehicle assigned to the determined braking capacity.

* * * * *